C. M. McCOY.
HOSE REEL.
APPLICATION FILED AUG. 6, 1913.

1,124,491.

Patented Jan. 12, 1915.

Inventor
C. M. McCoy.

Witnesses

By

Attorneys.

UNITED STATES PATENT OFFICE.

CLAUDE M. McCOY, OF EAST LIVERPOOL, OHIO.

HOSE-REEL.

1,124,491.  Specification of Letters Patent.  Patented Jan. 12, 1915.

Application filed August 6, 1913. Serial No. 783,392.

*To all whom it may concern:*

Be it known that I, CLAUDE M. McCOY, citizen of the United States, residing at East Liverpool, in the county of Columbiana and State of Ohio, have invented certain new and useful Improvements in Hose-Reels, of which the following is a specification.

This invention relates to an improvement in hose reels.

The primary object of the invention is to provide a reel for garden hose on which the hose may be wound by propelling the reel over the ground.

A further object of the invention is to provide a structure which may be conveniently propelled across the ground, the rotation of the drum on which the hose is wound being controlled by means which may be operated adjacent the handle portion.

For a full understanding of the invention, reference is to be had to the following description and accompanying drawing, in which:—

Figure 1:
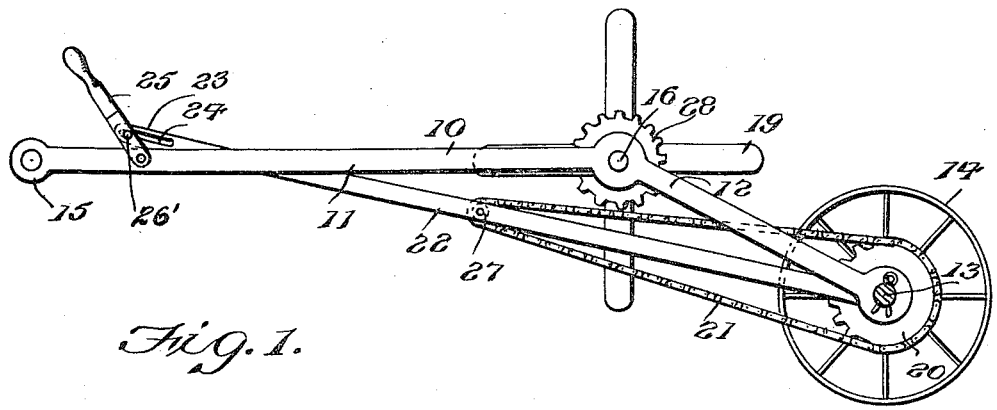
Figure 2:
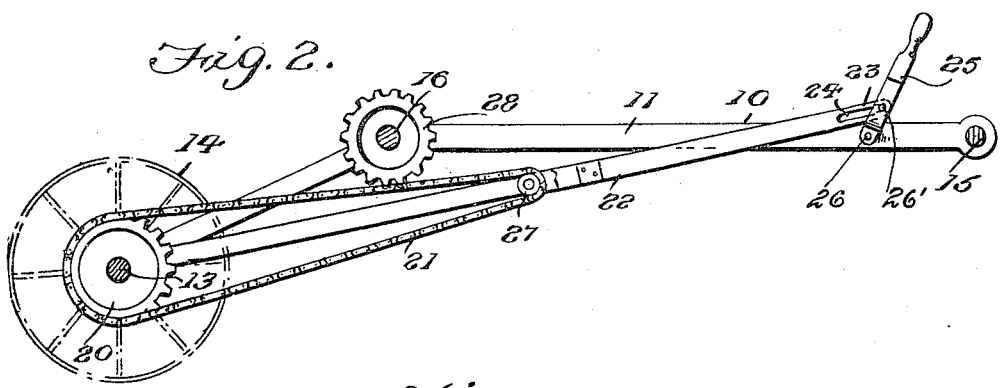
Figure 3:
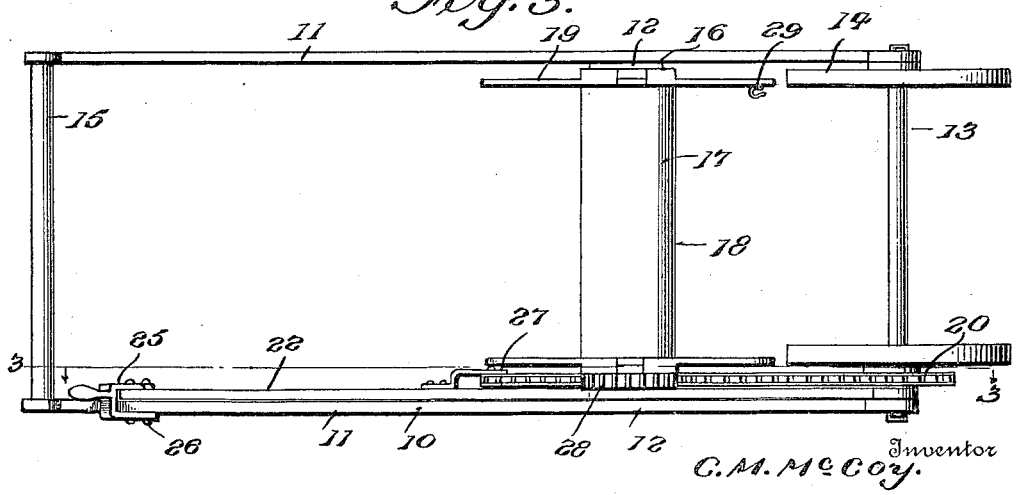

Figure 1 is a side elevation; Fig. 2 is a longitudinal section; and Fig. 3 is a top plan view.

Corresponding and like parts are referred to in the following description and indicated in all the views of the accompanying drawing by the same reference characters.

In the drawing, 10 designates a frame which consists of the side bars 11 which are offset as at 12, the terminals of the offset portions supporting a shaft 13 on which wheels 14 are mounted. A handle 15 connects the side members at their ends remote from the shaft 13. A shaft 16 is supported by the side members at the point where they are offset, a drum 17 being mounted on said shaft. This drum comprises the spool portion 18 and the radially extending arms 19. A sprocket wheel 20 is mounted on the shaft 13, a chain 21 passing over said sprocket. A lever 22 is pivotally mounted on the shaft 13, said lever extending between the side members of the frame to a point adjacent the handle 15. The terminal 23 of the lever 22 is provided with a slot 24. An arm 25 is pivotally supported on the side member 11 of the frame adjacent the lever 22. The lower terminal of this arm is bifurcated and embraces the lever 22, a pin 26 passing through the terminals of said lever and the side member 11. A pin 26′ passes through the bifurcations of the arm and extends through the slot formed in the lever 22. It will be noted that as the arm 25 is moved on its pivot, the lever 22 will be moved vertically. An idle roller 27 is mounted on the lever, the sprocket chain 21 passing over said roller, the chain thus being raised and lowered as the arm 25 is moved. A sprocket 28 is mounted on the shaft 16, said sprocket being driven by the chain 21 when it is desired to rotate the hose drum.

In winding the hose upon the drum, one terminal of the same is attached thereto in any suitable manner, and the arm 25 swung on its pivot to bring the chain 21 in mesh with the sprocket 28. The device is then drawn across the ground, the wheels 14 driving the sprocket chain and rotating the reel. After the hose has been wound upon the drum, the arm 25 is shifted and the chain 21 brought out of mesh with the sprocket 28. The nozzle of the hose is then attached to a clip 29 carried by one of the arms 19, and the reel may be propelled without actuating the hose drum.

The many advantages of a construction of this character will be clearly apparent, as it will be noted that it forms a light and convenient hose carriage which may be easily and economically manufactured, and in which the rotation of the hose drum may be controlled from a point adjacent the handle of the frame.

What I claim is:—

1. A hose reel comprising a frame, said frame including side members, a shaft supported at the terminals of said side members, wheels mounted on said shaft, a shaft supported intermediate the ends of said side members, a drum mounted on the second-mentioned shaft, a sprocket arranged on the first-mentioned shaft, a chain passing over said sprocket, a sprocket arranged on the second-mentioned shaft, a lever pivotally supported on the first-mentioned shaft and extending beneath the second-mentioned shaft adjacent the sprocket mounted thereon, a roller carried by said lever over which said chain passes, one terminal of said lever being slotted, a bifurcated arm pivotally mounted on one of the side members and embracing the lever, a pin passing through the bifurcations of said arm and extending within the slot of the lever, whereby movement of the arm will raise and lower the lever to bring the chain into and out of mesh with the sprocket of the second-mentioned shaft.

2. A hose reel including a frame having angularly disposed portions, supporting wheels carried by the frame adjacent one extremity thereof, a sprocket mounted to rotate with the supporting wheels and arranged concentrically therewith, a lever pivotally mounted concentrically with said sprocket and extending across the angle between the angularly disposed portions of the frame, a roller carried by the lever, a sprocket chain engaging the sprocket and passing around the roller, a drum mounted upon the frame at the intersection of the angularly disposed portions thereof, a second sprocket mounted to rotate with the drum, and means engaging the free extremity of the lever and connected to the frame for moving the sprocket chain into or out of engagement with the sprocket mounted to rotate with the drum.

In testimony whereof I affix my signature in presence of two witnesses.

CLAUDE M. McCOY. [L. s.]

Witnesses:
 James E. Davis,
 Nellie White.

Copies of this patent may be obtained for five cents each, by addressing the "Commissioner of Patents, Washington, D. C."